April 12, 1955     R. W. BROWN     2,706,022
GUYED MASTS
Original Filed March 24, 1947     2 Sheets-Sheet 1
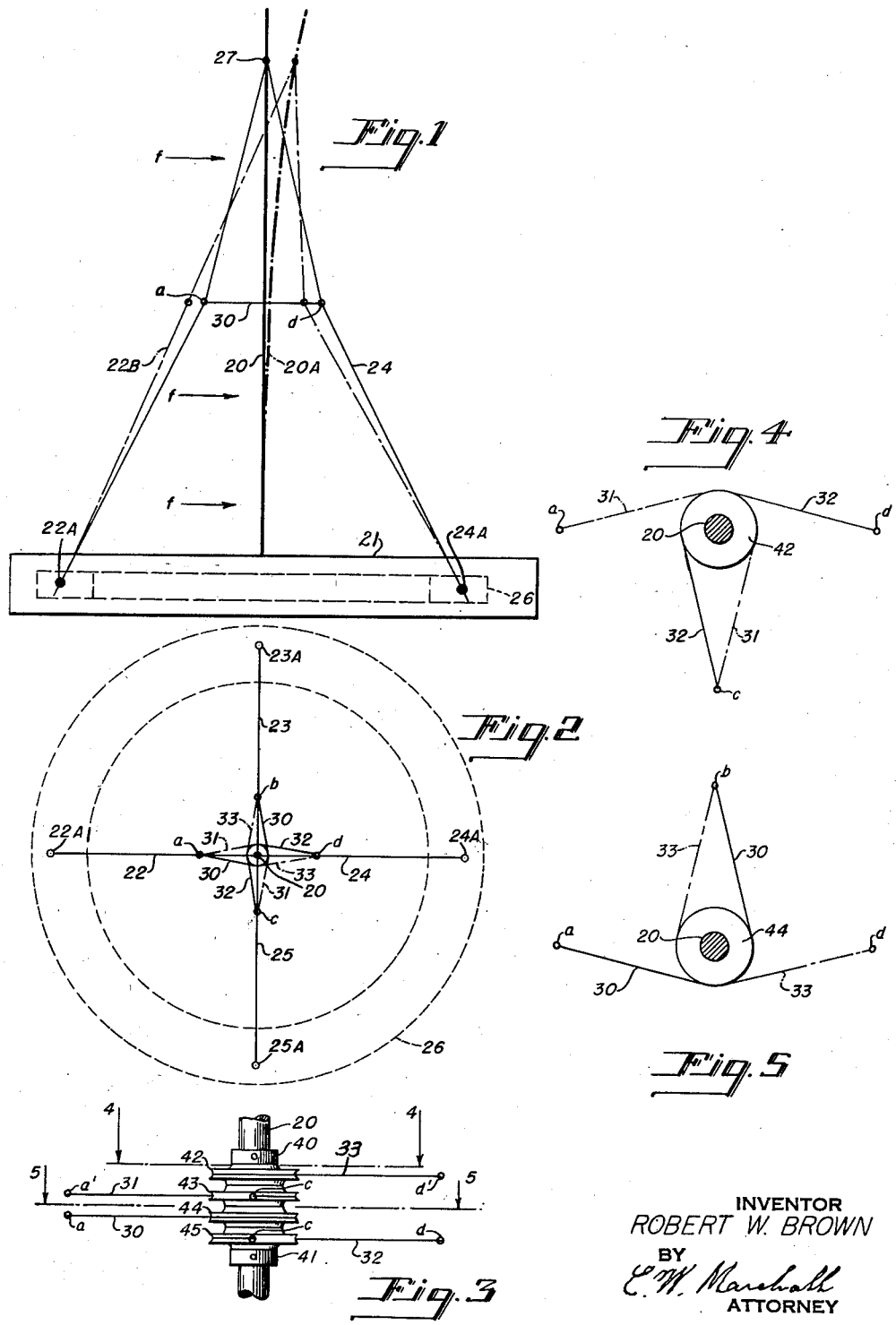
INVENTOR
ROBERT W. BROWN
BY
E. W. Marshall
ATTORNEY

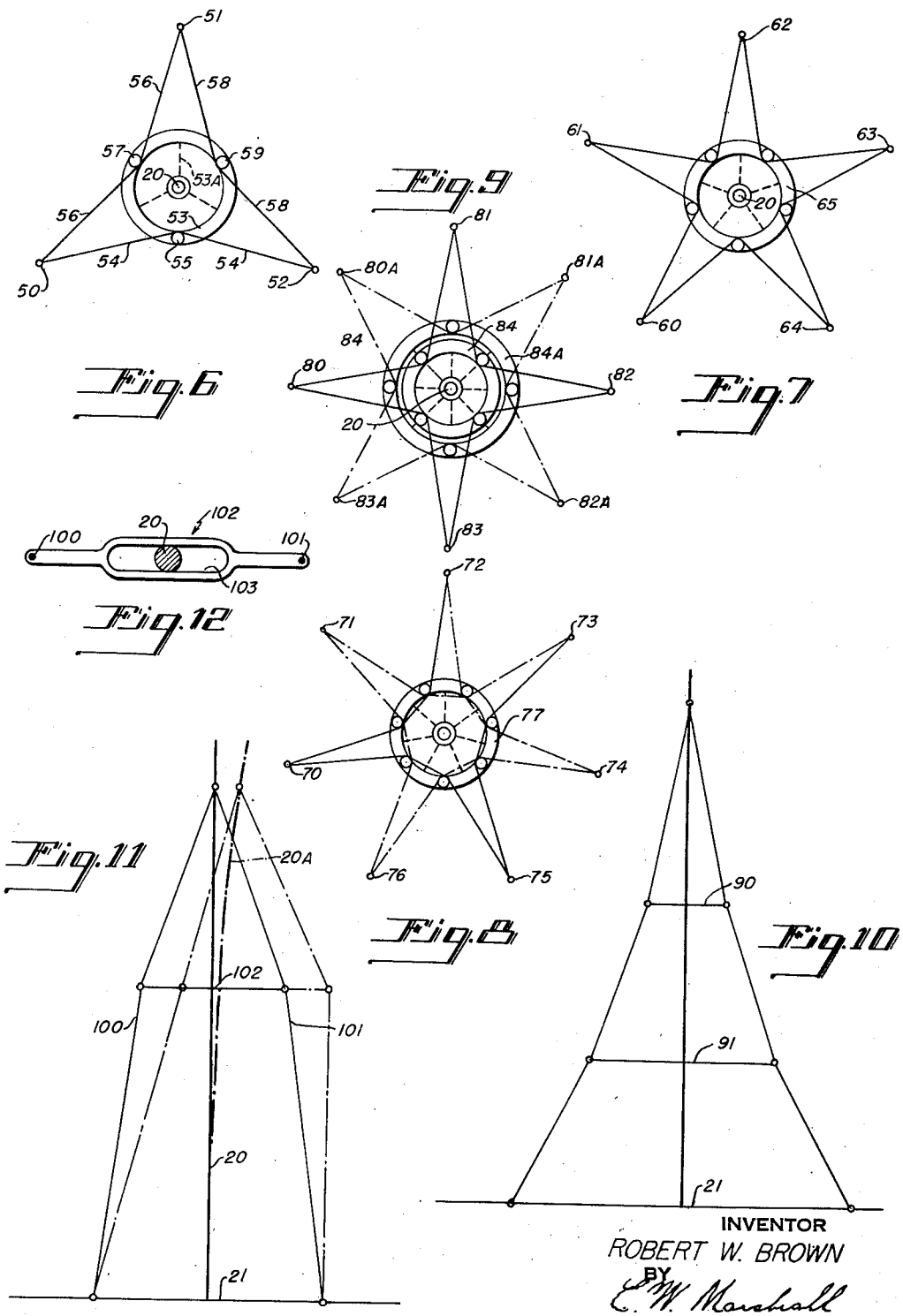

United States Patent Office 2,706,022
Patented Apr. 12, 1955

2,706,022
GUYED MASTS

Robert W. Brown, Baldwin, N. Y.

Continuation of abandoned application Serial No. 736,871, March 24, 1947. This application November 15, 1950, Serial No. 195,880

4 Claims. (Cl. 189—31.5)

This invention relates to a guyed mast. Its object is to provide an improved system of interconnected angularly spaced guy lines whereby an increased tension applied to any one or more of them by external forces will be transmitted automatically to others, so that as the stresses on the guy lines are distributed most or all of them will be effective in supporting the mast.

More specifically, I have provided intermediate the ends of each guy line a member positively connected with one or more other guy lines which, either by tension or compression, forces them out of straight lines and which, whenever a force acting laterally on the mast tends to straighten one or more of the guy lines, forces other guy lines further out of straight lines, and thereby maintains the tension between the points of anchorage of said other lines and their points of connection with the mast. By these arrangements the interconnected guy lines may be kept under proper tension when the mast is moved out of a vertical position by lateral pressure. This stabilizes the mast and makes it possible to use fewer and smaller guy lines and lighter masts.

These and other objects of the invention will appear in the following specification, in which I will describe several modifications of the invention and will point out its novel features in claims.

This application is a continuation of application Serial Number 736,871, filed by me March 24, 1947, now abandoned.

Referring to the drawings,

Fig. 1 is a diagrammatic elevation of a guyed mast made according to and embodying my invention. In this figure the mast is represented in a vertical position by a heavy full line, and as deflected to an exaggerated degree, by a heavy dot-and-dash line. Two of four guy lines connected to the mast in its vertical position are represented by full lines, and the positions they assume when the mast is deflected laterally are represented by light dot-and-dash lines. No attempt is made in this figure to show the diameter of the mast.

Fig. 2 is a plan view of a modification of the structure shown in Fig. 1, with the mast in a vertical position, and shows four equally spaced guy lines and their interconnecting members.

Fig. 3 is an elevation on a somewhat enlarged scale of a part of a mast with an arrangement on it for preventing relative vertical movement between the interconnecting members and the mast. In this figure four guy lines are shown with the interconnecting members 30, 31, 32 and 33 separated vertically for clarity.

Figs. 4 and 5 are sectional plan views taken respectively on the lines 4—4 and 5—5 of Fig. 3.

Fig. 6 is a diagrammatic plan view, showing three guy lines interconnected in a different manner within the scope of my invention.

Fig. 7 is a view similar to Fig. 6, showing five interconnected guy lines.

Fig. 8 is a similar view, showing seven guy lines interconnected in a still different manner.

Fig. 9 is a similar view of a further modified form of connection showing eight guy lines.

Fig. 10 is a modification of Fig. 1, showing the guy lines interconnected at vertically spaced intervals.

Fig. 11 shows a further modification, in which a mast with two guy lines is shown, with the guy lines interconnected by a compression member; and Fig. 12 is a plan view of the compression member shown in Fig. 11.

Referring first to Figs. 1 and 2, 20 designates a vertical mast supported on a base the upper surface of which is designated by the reference numeral 21. The mast is represented at 20A by a heavy dot-and-dash line in a deflected position. 22, 23, 24, 25 designate guy lines, which are connected to angularly spaced points at 22A, 23A, 24A and 25A to an annular anchorage member 26 in the base 21, and to the upper part of the mast at 27. The anchorage points are shown symmetrically disposed, but it is not necessary that they be equally spaced from the mast or equally spaced angularly from each other, nor is it necessary to have the guy lines connected to the same point on the upper part of the mast.

30 is flexible member interconnecting a point $a$ on guy line 22 with a point $b$ on guy line 23 after passing around the mast 20. 31 is a similar member which runs from the point $a$ on guy line 22 around the mast to a point $c$ on the guy line 25. 32 is a similar member between the point $b$ on guy line 23 and point $d$ on guy line 24. 33 is a similar member between the point $b$ on guy line 23, and the point $d$ on guy line 24. These points of connection are intermediate the lower and upper ends of the guy lines and the ends of the interconnecting members are affixed positively to the guy lines. The interconnecting members pass a side of the mast, and are shorter than the distances between their respective points of connection would be if the guy lines were straight. They are under tension and pull the guy lines inwardly toward the mast, so that they are deflected out of straight lines.

The lines $f$, $f$, $f$ indicate the force of a wind blowing toward the mast from the left-hand side. If such a force or any other force moves the mast toward the position shown at 20A, the guy line 22 will be moved toward a straightened condition, indicated by a dot-and-dash line 22B in Fig. 1. This will move the point $a$ further away from the mast. The interconnecting members 30, 31 will pull the points $b$ and $c$ respectively toward the mast, thus increasing the amount of their deviation from straight lines and increasing their tension. Thus, an increase of tension on one of the guy lines effected by an external force will automatically maintain the tension on the guy lines with which it is connected.

Referring to Fig. 3, there is shown affixed to the mast 20 a pair of spaced collars 40, 41, between which are grooved pulleys 42, 43, 44, 45. These are freely rotatable on the mast, but are restrained against vertical movement in relation to the mast by the collars 40, 41.

The interconnecting member 30 passes from the point $a$ on the guy line 22 around the pulley 44, and thence to the point $b$ on the guy line 23. The ends of this member 30 are positively connected to the guy lines 22, 23 at the points $a$ and $b$. The interconnecting member 31 passes from point $a^1$ on the guy line 22 around the pulley 43 and thence to a point $c$ on the guy line 23. In Fig. 3, the guy line deflecting members 30, 31 are shown vertically spaced so that the point $a$ of the connection of the member 30 with guy line 22 is below the point $a^1$ of the connection of the member 31 with said guy line 22. Similarly, the interconnecting member 32 passes around the pulley 45, and the interconnecting member 33 passes around the pulley 42. The points of connection of the members 32, 33 with the guy line 24 are also shown separated at $d$ and $d^1$. By means of some such arrangement for preventing vertical movement of the flexible connectors, the mast is better supported by the guy lines. It may be seen from Fig. 4, for example, that if the mast 20 is moved by the wind or other force away from the point $c$, the tension on the members 31, 32 will be increased, and this additional tension will be transmitted to the guy lines 22 and 24.

In Fig. 6 another arrangement for interconnecting intermediate points on angularly spaced guy lines is illustrated diagrammatically. In this example, it is assumed that there are three guy lines, 50, 51, 52. 53 designates a ring surrounding the mast 20. The ring may be connected to the mast by ties 53A. 54 is a flexible tension member interconnecting the guy lines 50, 52 after passing around a pin 55 which projects from the ring 53. 56 is a similar tension member interconnecting the guy lines 50, 51 after passing around a pin 57 on the ring 50, and 58 is a tension member passing around a pin 59 and interconnecting the guy lines 51, 52. A movement of the guy line 50 away from the mast, which may be effected by an external force acting upon the mast, will automatically pull the guy lines 51, 52 toward the mast and maintain the tension on them. This action will tend to pull the ring 53 toward the guy line 50, and this will further increase automatically the tension on the guy lines 51, 52.

In Fig. 7 five guy lines 60, 61, 62, 63, 64, and a ring 65 are shown, with interconnecting tension members between them which pass over pins projecting from the ring 65. The operation of this arrangement is similar to that shown in Fig. 3.

In Fig. 8 seven interconnected guy lines, 70, 71, 72, 73, 74, 75, 76, and a ring 77 are shown. An interconnecting member 78 runs from guy line 70 around two pins on the ring 77 and to the guy line 72. The other guy lines are similarly interconnected.

In Fig. 9 one set of four guy lines, 80, 81, 82, 83, and a ring 84 are shown, interconnected in the manner described in connection with the arrangements in Figs. 6 and 7, and another set of four guy lines 80A, 81A, 82A, 83A, is shown, intermediate the first set and interconnected by tension members which pass around pins on a ring 84A.

In Fig. 10 the interconnecting members are shown at two vertically spaced points, 90, 91. The operation of this arrangement is obviously similar to that previously described.

In Figs. 11 and 12 a modification is shown in which diametrically opposed guy lines 100, 101 are spread apart by a slidable compression member 102. This compression member, as shown in Fig. 12, has an elongated slot 103, through which the mast 20 passes. This prevents displacement of the member 102 in directions normal to its length. In this case, when the mast 20 is deflected to the position shown at 20A, the tendency of the left-hand guy line 100 to straighten brings it closer to the mast and forces the guy line 101 on the opposite side of the mast outwardly to maintain its tension.

Because of the simplicity of the various modifications which have been shown and described, and others which will occur to those skilled in the art, the erection of a mast is not difficult and can be effected without the use of scaffolding or cumbersome apparatus.

Various modifications in construction, mode of operation, method and use of an invention may and do occur to others, especially after benefiting from knowledge of such a disclosure as that herein presented of the principles involved, but the invention itself is not confined to the present showing.

I claim:

1. A mast, a base supporting the mast, guy lines affixed to the base at points laterally spaced from the mast, angularly spaced from one another and affixed to an upper part of the mast, and a guy line deflecting member disposed normal to the axis of the mast, extending freely around the mast with its opposite ends affixed to different guy lines at points intermediate the ends thereof, deflecting said guy lines out of a straight line.

2. A mast, a base supporting the mast, guy lines affixed to the base at points laterally spaced from the mast, angularly spaced from one another, and affixed to an upper part of the mast, and a flexible tension guy line deflecting member disposed normal to the axis of the mast, extending freely around the mast with its opposite ends affixed to different guy lines at points intermediate the ends thereof, deflecting said guy lines out of a straight line.

3. A mast, a base supporting the mast, guy lines affixed to the base at points laterally spaced from the mast, angularly spaced from one another at least 90 degrees and affixed to an upper part of the mast, and a guy line deflecting member disposed normal to the axis of the mast, extending freely around the mast with its opposite ends affixed to different guy lines at points intermediate the ends thereof, deflecting said guy lines out of a straight line.

4. A mast, a base supporting the mast, guy lines affixed to the base at points laterally spaced from the mast, angularly spaced from one another and affixed to an upper part of the mast, and a plurality of flexible tension guy line deflecting members disposed normal to the axis of the mast, each extending freely around the mast and having its opposite ends affixed to different guy lines at points intermediate the ends thereof, deflecting said guy lines out of a straight line.

References Cited in the file of this patent

UNITED STATES PATENTS

| | | |
|---|---|---|
| 287,881 | Smith | Nov. 6, 1883 |
| 846,001 | Blessing | Mar. 5, 1907 |

FOREIGN PATENTS

| | | |
|---|---|---|
| 519,606 | France | Jan. 27, 1921 |